United States Patent
Arisi et al.

(10) Patent No.: US 11,028,700 B2
(45) Date of Patent: Jun. 8, 2021

(54) AIRFOIL WITH COOLING PASSAGE CIRCUIT THROUGH PLATFORMS AND AIRFOIL SECTION

(71) Applicant: United Technologies Corporation, Farmington, CT (US)

(72) Inventors: Allan N. Arisi, Manchester, CT (US); Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 335 days.

(21) Appl. No.: 16/594,125

(22) Filed: Oct. 7, 2019

(65) Prior Publication Data

US 2020/0332661 A1  Oct. 22, 2020

Related U.S. Application Data

(60) Provisional application No. 62/757,930, filed on Nov. 9, 2018.

(51) Int. Cl.
| F01D 5/18 | (2006.01) |
| F01D 25/12 | (2006.01) |
| F02C 7/18 | (2006.01) |

(52) U.S. Cl.
CPC ............. *F01D 5/186* (2013.01); *F01D 5/187* (2013.01); *F01D 25/12* (2013.01); *F02C 7/18* (2013.01);
(Continued)

(58) Field of Classification Search
CPC ... F01D 5/08; F01D 5/18; F01D 5/187; F01D 25/08; F01D 25/12; F05D 2240/81;
(Continued)

(56) References Cited

U.S. PATENT DOCUMENTS

| 3,807,892 A | 4/1974 | Frei et al. |
| 7,553,131 B2 * | 6/2009 | Cunha ................ F01D 5/186 |
| | | 415/115 |

(Continued)

FOREIGN PATENT DOCUMENTS

EP  0031174  7/1981

OTHER PUBLICATIONS

European Search Report for European Patent Application No. 19207980.4 completed Jan. 7, 2020.

*Primary Examiner* — David E Sosnowski
*Assistant Examiner* — Danielle M. Christensen
(74) *Attorney, Agent, or Firm* — Carlson, Gaskey & Olds, P.C.

(57) ABSTRACT

An airfoil includes a cooling passage circuit that has a first plenum, a skincore passage, a first connector passage, a second plenum, and a second connector passage. The first plenum is in a first platform and extends adjacent a first side, a trailing end, and a second side of and airfoil section. The skincore passage is embedded in the first side of the airfoil section and extends longitudinally. The first connector passage is longitudinally spaced from an internal core cavity in the airfoil section so as to extend around the cavity. The first connector passage connects the first plenum with the skincore passage. The second plenum is in the second platform and extends adjacent the first side, the trailing end, and the second side of the airfoil section. The second connector passage connects the skincore passage with the second plenum.

19 Claims, 6 Drawing Sheets

(52) U.S. Cl.
CPC .... *F05D 2220/32* (2013.01); *F05D 2240/124* (2013.01); *F05D 2240/126* (2013.01); *F05D 2240/127* (2013.01); *F05D 2240/81* (2013.01); *F05D 2260/20* (2013.01); *F05D 2260/202* (2013.01)

(58) Field of Classification Search
CPC ......... F05D 2240/124; F05D 2240/126; F05D 2240/127; F05D 2260/20; F05D 2260/204; F05D 2260/205
See application file for complete search history.

(56) References Cited

U.S. PATENT DOCUMENTS

| | | | |
|---|---|---|---|
| 7,819,629 B2 * | 10/2010 | Liang | F01D 5/187 |
| | | | 416/97 R |
| 7,967,568 B2 | 6/2011 | Dalton et al. | |
| 8,414,263 B1 | 4/2013 | Liang | |
| 2014/0000285 A1 * | 1/2014 | Bergman | F01D 5/187 |
| | | | 60/806 |
| 2017/0211416 A1 | 7/2017 | Weaver et al. | |
| 2018/0230813 A1 * | 8/2018 | Jones | F01D 5/187 |

\* cited by examiner

AIRFOIL WITH COOLING PASSAGE CIRCUIT THROUGH PLATFORMS AND AIRFOIL SECTION

CROSS-REFERENCE TO RELATED APPLICATION

This application claims priority to U.S. Provisional Application No. 62/757,930 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil section that has an airfoil wall that defines a leading end, a trailing end, and first and second sides that join the leading end and the trailing end. The first and second sides span in a longitudinal direction between first and second ends. The airfoil wall circumscribes an internal core cavity. First and second platforms are attached, respectively, with the first and second ends, and a cooling passage circuit extends in the first platform, the airfoil section, and the second platform. The cooling passage circuit includes a first plenum in the first platform. The first plenum extends adjacent the first side of the airfoil wall, adjacent the trailing end, and adjacent the second side of the airfoil wall. A skincore passage is embedded in the first side of the airfoil wall and extending longitudinally. A first connector passage is longitudinally spaced from the internal core cavity so as to extend around the internal core cavity. The first connector passage connects the first plenum with the skincore passage. A second plenum is in the second platform. The second plenum extends adjacent the first side of the airfoil wall, adjacent the trailing end, and adjacent the second side of the airfoil wall. A second connector passage connects the skincore passage with the second plenum.

In a further embodiment of any of the foregoing embodiments, the first plenum has an inlet adjacent the first side.

In a further embodiment of any of the foregoing embodiments, the first plenum wraps around the internal core cavity.

In a further embodiment of any of the foregoing embodiments, the skincore passage includes a plurality of longitudinally-elongated ribs that define longitudinally-elongated passages there between.

In a further embodiment of any of the foregoing embodiments, the skincore passage includes a plurality of trip strips in the longitudinally-elongated passages.

In a further embodiment of any of the foregoing embodiments, the second connector passage defines a central connector passage axis that forms an oblique angle with the longitudinal direction.

In a further embodiment of any of the foregoing embodiments, the second plenum includes a plurality of trip strips.

In a further embodiment of any of the foregoing embodiments, the second platform includes a plurality of orifices. Each said orifice has an inlet end that opens to the second plenum and an outlet end that opens to an exterior of the second platform.

In a further embodiment of any of the foregoing embodiments, the first side is a suction side and the second side is a pressure side.

In a further embodiment of any of the foregoing embodiments, the skincore passage includes a plurality of longitudinally-elongated ribs that define longitudinally-elongated passages there between.

In a further embodiment of any of the foregoing embodiments, the second platform includes a plurality of orifices. Each said orifice has an inlet end that opens to the second plenum and an outlet end that opens to an exterior of the second platform.

In a further embodiment of any of the foregoing embodiments, the first plenum wraps around the internal core cavity.

In a further embodiment of any of the foregoing embodiments, the second connector passage defines a central connector passage axis that forms an oblique angle with the longitudinal direction.

A gas turbine engine according to an example of the present disclosure includes a compressor section, a combustor in fluid communication with the compressor section, and a turbine section in fluid communication with the combustor. The turbine section has a turbine airfoil according to any of the foregoing embodiments.

In a further embodiment of any of the foregoing embodiments, the first plenum wraps around the internal core cavity.

In a further embodiment of any of the foregoing embodiments, the skincore passage includes a plurality of longitudinally-elongated ribs that define longitudinally-elongated passages there between.

In a further embodiment of any of the foregoing embodiments, the second connector passage defines a central connector passage axis that forms an oblique angle with the longitudinal direction.

In a further embodiment of any of the foregoing embodiments, the second platform includes a plurality of orifices. Each said orifice has an inlet end that opens to the second plenum and an outlet end that opens to an exterior of the second platform.

In a further embodiment of any of the foregoing embodiments, the first side is a suction side and the second side is a pressure side.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
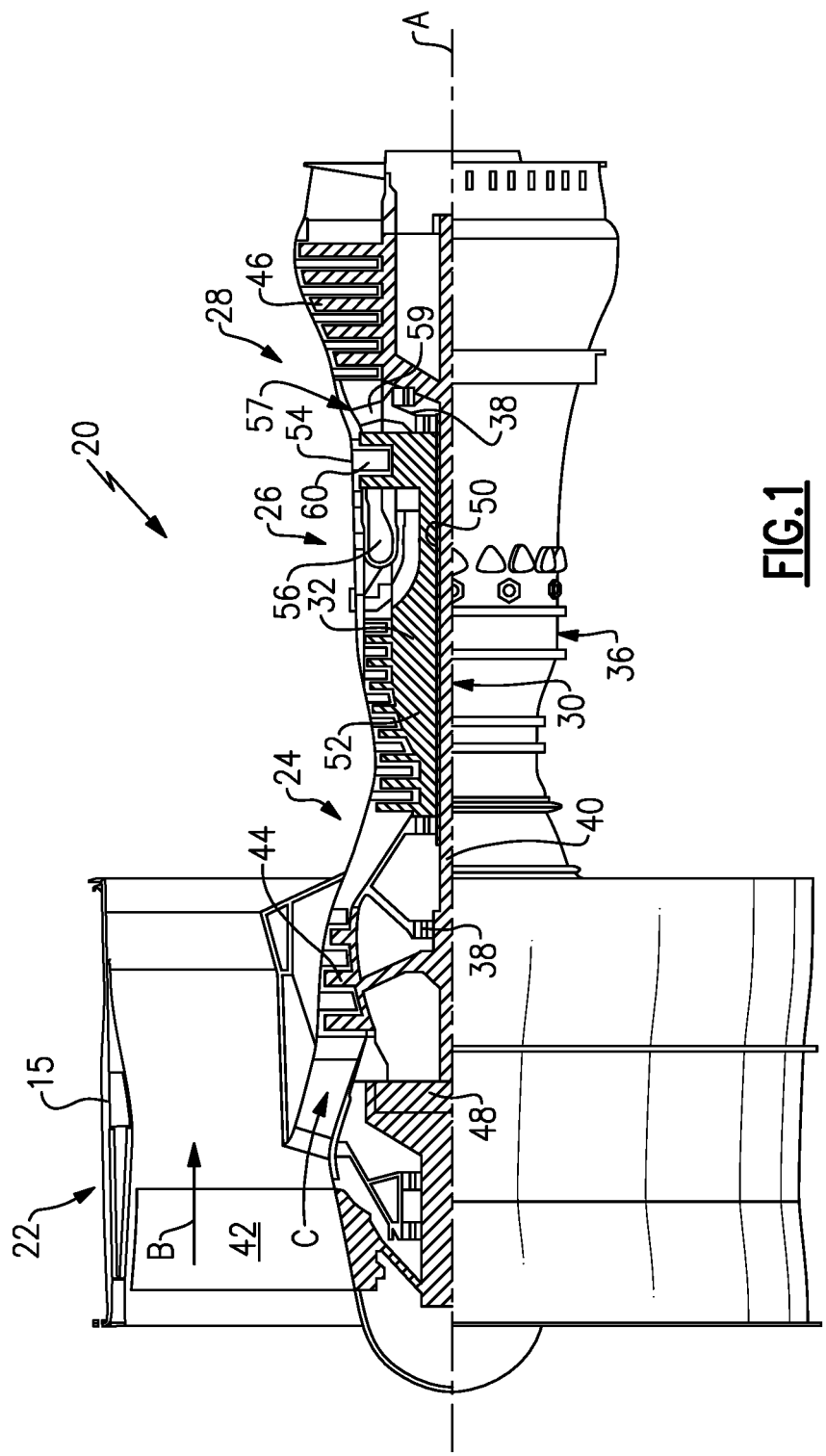
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
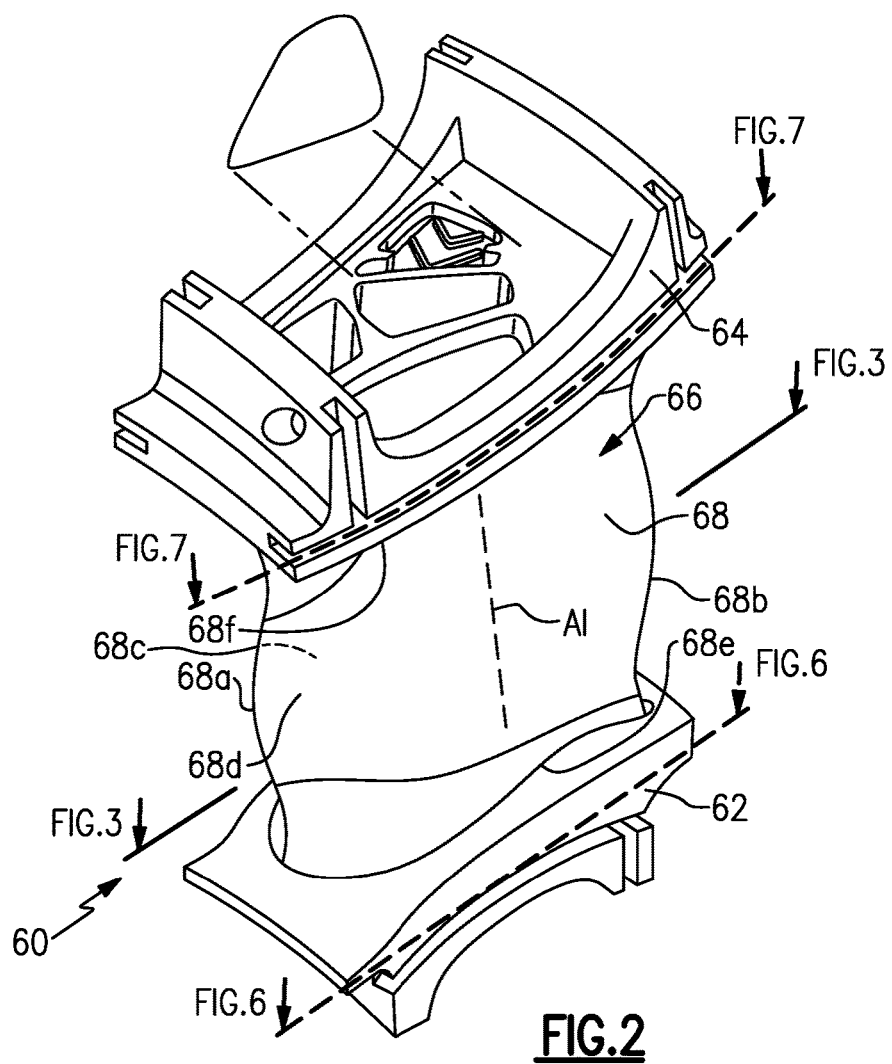
FIG. 2 illustrates an airfoil of the engine of FIG. 1.

FIG. 2 illustrates a representative example of a turbine airfoil 60 used in the turbine engine 20 (see also FIG. 1). As shown, the turbine airfoil 60 is a turbine vane; however, it is to be understood that, although the examples herein may be described with reference to the turbine vane, this disclosure is also applicable to turbine blades and turbine vanes in other locations than shown.

The turbine airfoil 60 includes an inner or first platform 62, an outer or second platform 64, and an airfoil section 66 that spans in a longitudinal direction A1 (which is also a radial direction relative to the engine central axis A) between the first and second platforms 62/64. Terms such as "radially," "axially," or variations thereof are used herein to designate directionality with respect to the engine central axis A.

Figure 3:
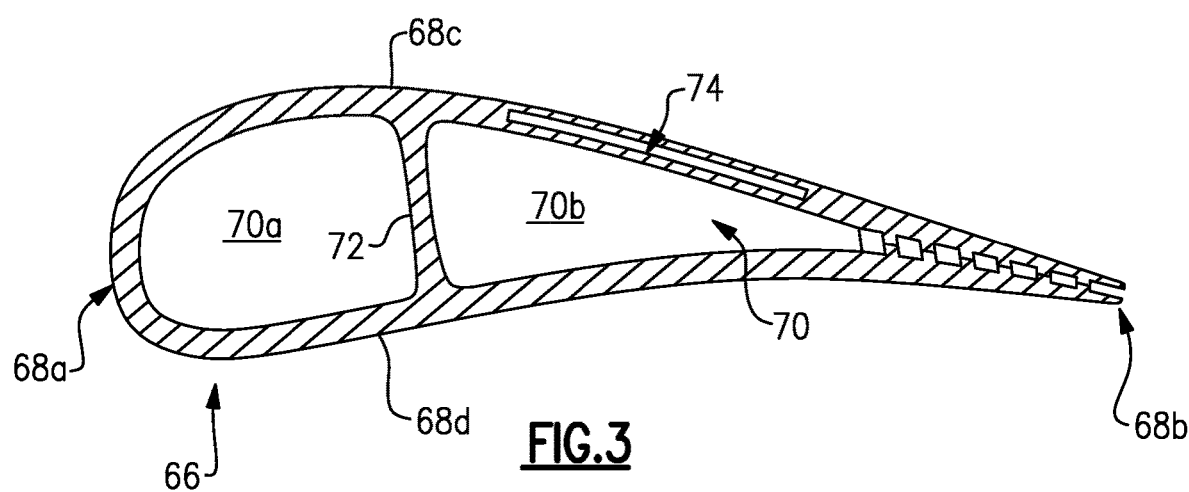
FIG. 3 illustrates a sectioned view of the airfoil of FIG. 3.

The airfoil section 66 includes an airfoil outer wall 68 that delimits the profile of the airfoil section 66. The outer wall 68 defines a leading end 68a, a trailing end 68b, and first and second sides 68c/68d that join the leading and trailing ends 68a/68b. The first and second sides 68c/68d span in the longitudinal direction between first and second ends 68e/68f. The first and second ends 68e/68f are attached, respectively, to the first and second platforms 62/64. In this example, the first side 68c is a suction side and the second side 68d is a pressure side. As shown in a sectioned view through the airfoil section 66 in FIG. 3, the outer wall 68 circumscribes an internal core cavity 70. The airfoil section 66 may include a rib 72 that partitions the cavity 70 into a forward core cavity 70*a* and an aft core cavity 70*b*.

The airfoil section 66 further includes a skincore passage 74 embedded in the first side 68*c*. The skincore passage 74 is a cooling passage network and may also be referred to as a skincore. A "skincore" or "skincore passage" is a reference to the thin investment casting core or cores that is/are typically used to make such embedded passages, as opposed to a main core that is used to form a main or central core cavity in an airfoil.

A typical airfoil may be formed using several investment casting cores. Each core produces a passage or cavity in the airfoil. Bleed air from the compressor is typically fed to the passages and cavities for cooling the airfoil. Although effective for cooling, use of bleed air penalizes engine efficiency. Using less bleed air and using it more efficiently is desirable, however, there must be sufficient cooling to maintain durability requirements of the airfoil. A potential solution to improving bleed air efficiency is passing the bleed air through more of the airfoil. A challenge to that, however, is that it can be difficult to interconnect the various passages and cavities so that the bleed air can serially flow through more of the airfoil. The investment casting cores are typically isolated from each other and consolidation of several cores into single larger interconnected cores adds complexity and reduces manufacturability. In this regard, as will be described below in more detail, the airfoil 60 has an interconnection of several cores to provide a cooling passage circuit 76 ("circuit 76") that winds through the first platform 62, the airfoil section 66, and the second platform 64.

Figure 4:
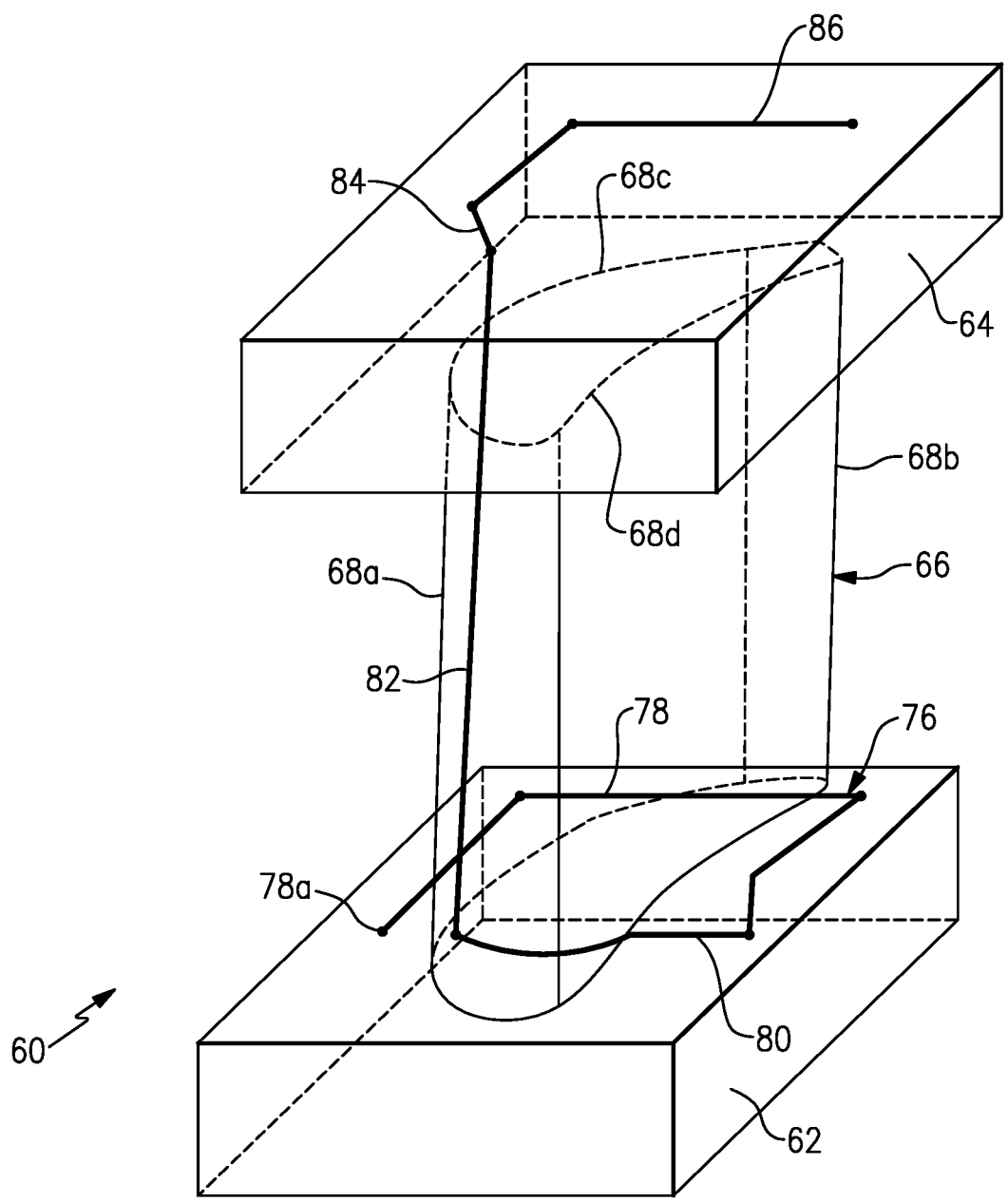
FIG. 4 illustrates a diagrammatic view of a cooling passage circuit represented as a wireframe.
Figure 5:
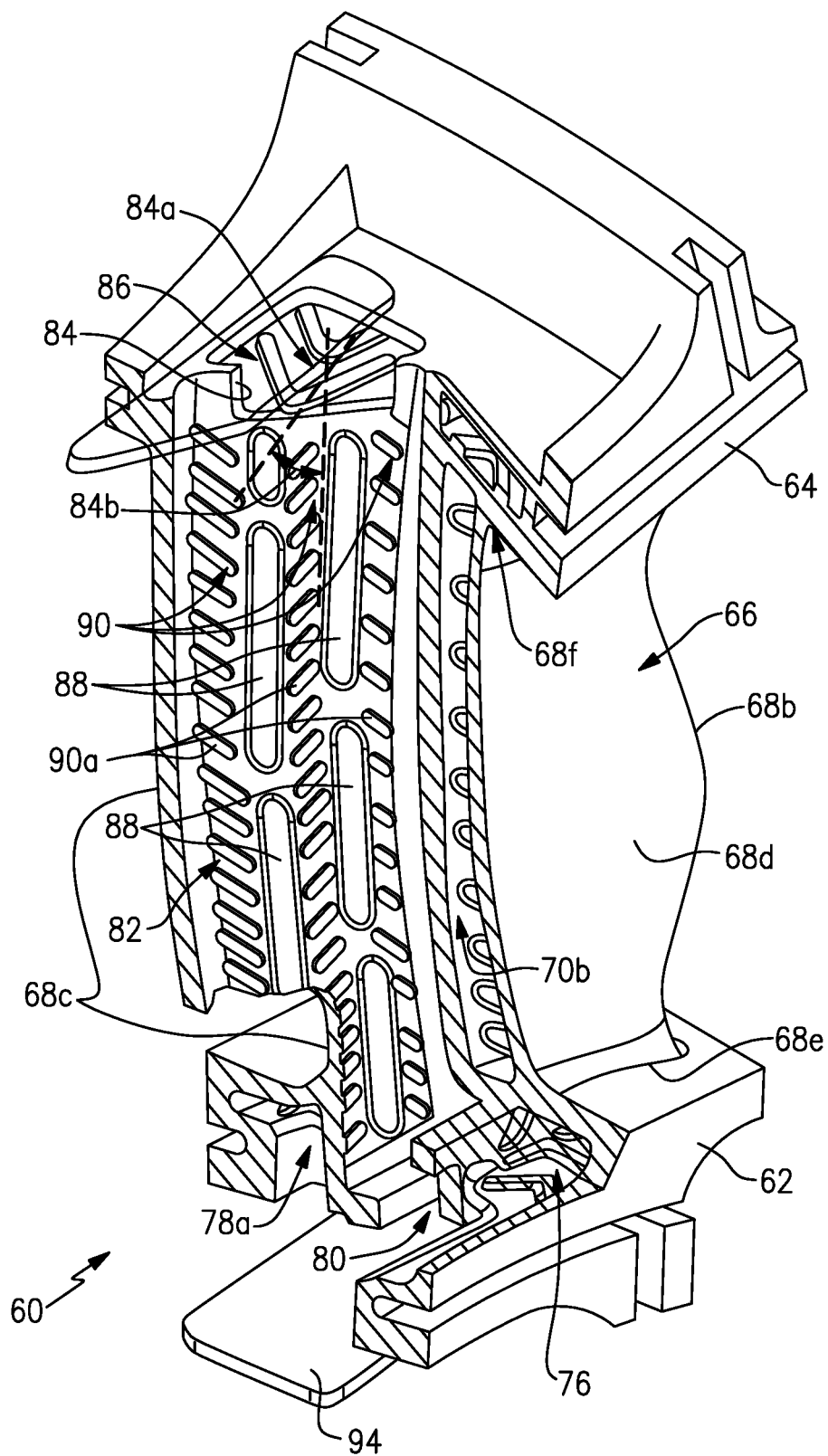
FIG. 5 illustrates a partial cutaway view of the airfoil of FIG. 2.
Figure 6:
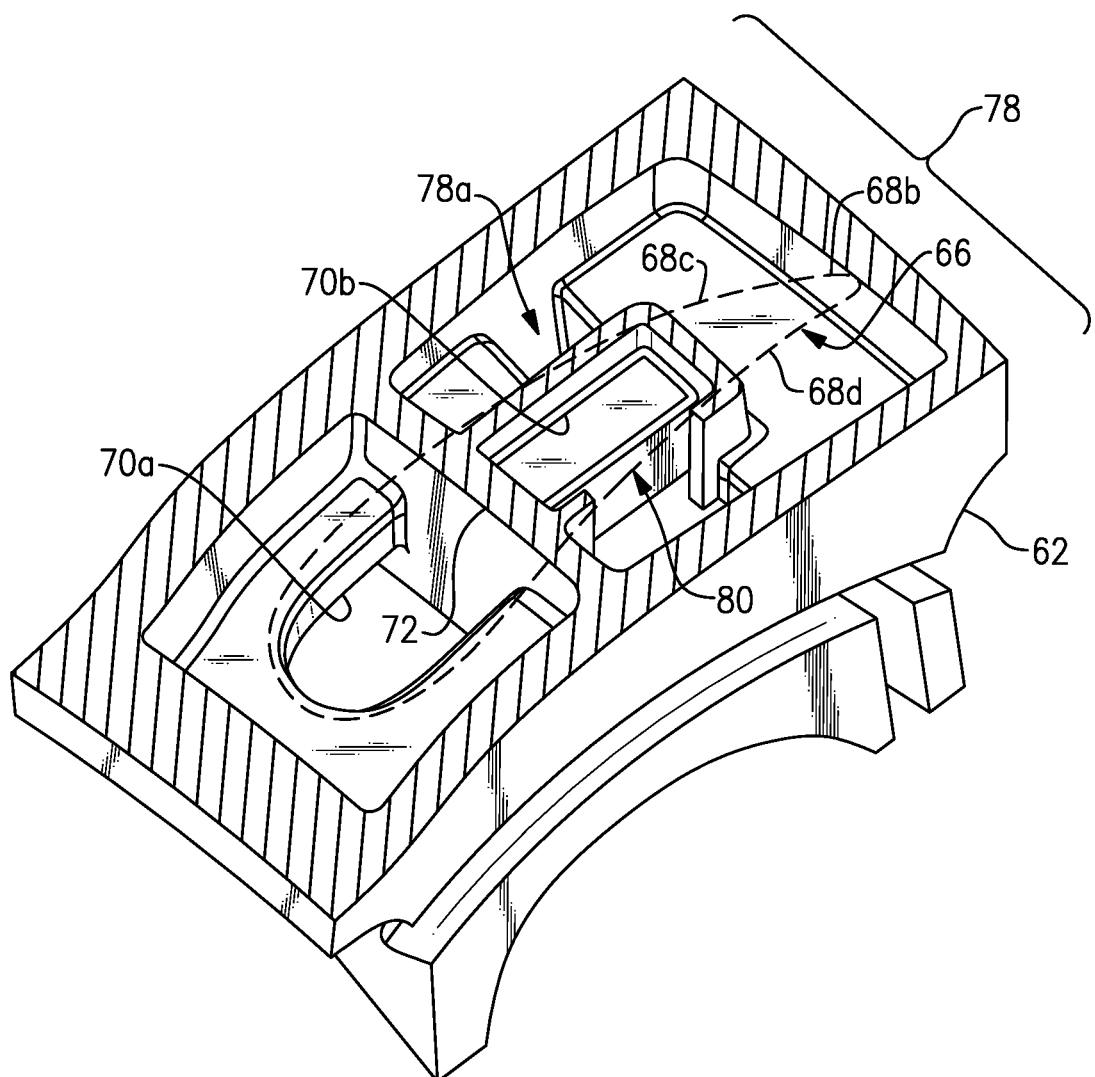
FIG. 6 illustrates a sectioned view through a first platform.
Figure 7:
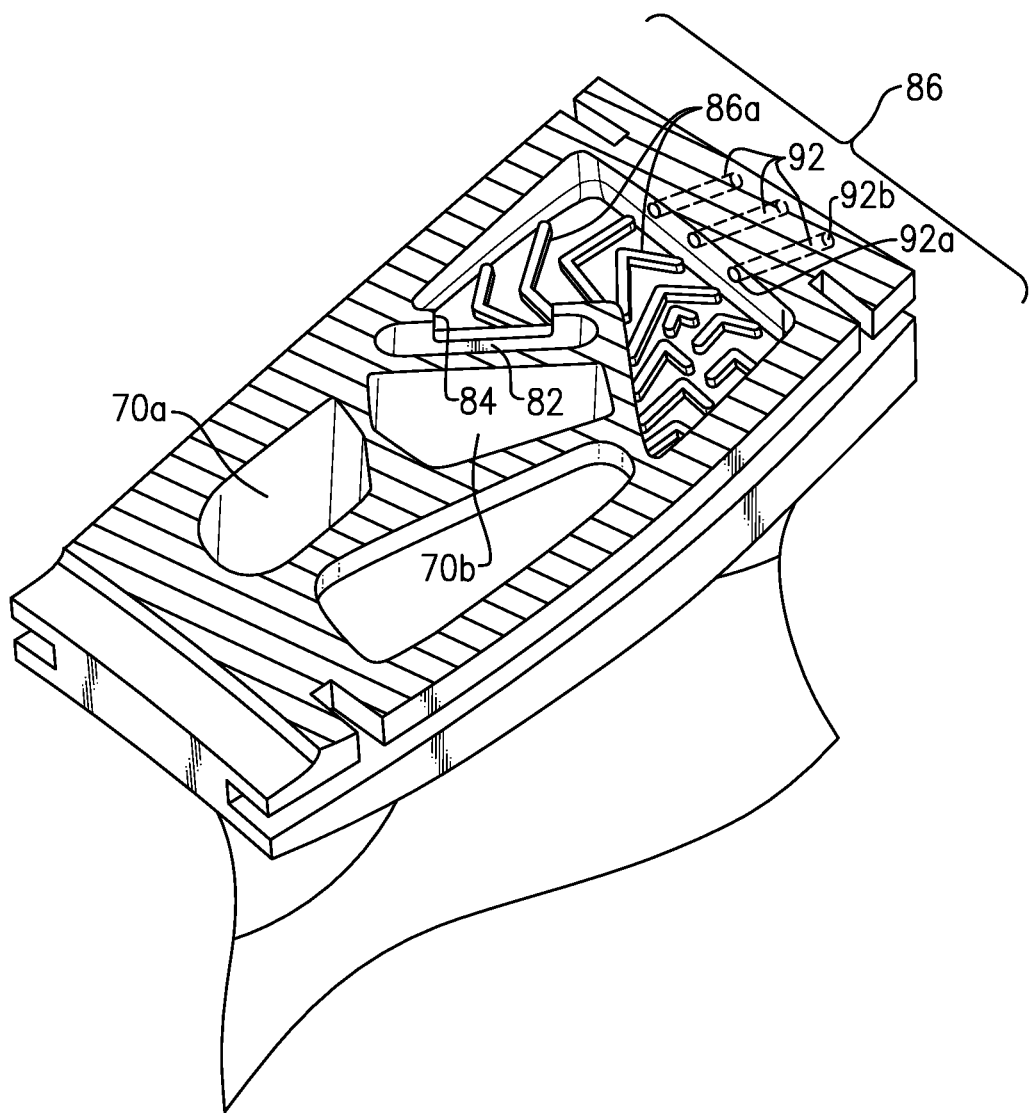
FIG. 7 illustrates a sectioned view through a second platform.

FIG. 4 depicts a diagrammatic representation of the airfoil 60. In this diagrammatic view the circuit 76 is represented as a wireframe in order to demonstrate the location and orientation of the various sections of the circuit 76 in the platforms 62/64 and airfoil section 66. The sections are distinct from one another are denoted by points on the wireframe, which will be also described with respect to the structures in the airfoil 60 as shown in the partial cutaway view in FIG. 5, sectioned view through the first platform 62 in FIG. 6, and sectioned view through the second platform 64 in FIG. 7. FIG. 6 also illustrates a projection of the airfoil section 66 in dashed lines to demonstrate the relative location of the structures in the first platform 62 to the airfoil section 66.

In general, the circuit 76 extends in the first platform 62, the airfoil section 66, and the second platform 64. For example, the circuit 76 represents a continuous, serial flow path in which cooling air that initially enters the circuit 76 flows through the sections of the circuit 76 in sequence to the end of the circuit 76. In the example shown, the circuit 76 is comprised of five sections, including, in serial order, a first plenum 78, a first connector passage 80, a skincore passage 82, a second connector passage 84, and a second plenum 86. As used herein, a "plenum" refers to a passage in which the passage width and length are substantially larger than the passage thickness, such as by a factor of at least 3 or of at least 5.

The first plenum 78 is within the first platform 62 and includes an inlet 78*a* at which cooling air initially enters the circuit 76. In this example, the inlet 78*a* is adjacent the first side 68*c* of the airfoil section 66. As shown in FIG. 6, some of the structures in the airfoil section 66, such as the cavities 70*a*/70*b* and rib 72, extend into or through the first platform 62. In this example, the first plenum 78 wraps around the cavity 70*b*. The first plenum 78 thus extends adjacent to each of the first side 68*c*, the trailing end 68*b*, and the second side 68*d* of the airfoil wall 68.

The first connector passage 80 connects the first plenum 78 with the skincore passage 82. The first connector passage 80 is longitudinally spaced from the cavity 70*b* so as to extend around (e.g., under) the cavity 70*b*.

The skincore passage 82 is embedded in the first side 68*c* of the airfoil wall 68 and extends longitudinally. The skincore passage 82 includes a plurality of longitudinally-elongated ribs 88 that define longitudinally-elongated passages 90 there between. In this example, the passages 90 include trip strips 90*a*. The trips strips 90*a* are elongated protrusions or ridges that are obliquely angled to the longitudinal direction of flow in order to cause turbulence in the flow and enhance cooling.

The skincore passage 82 extends into the second platform 64. The second connector passage 84 connects the skincore passage 82 in the second platform 64 to the second plenum 86. In this example, the second connector passage 84 defines a central connector passage axis 84*a*. The axis 84*a* forms an oblique angle, as represented at 84*b*, with the longitudinal direction A1.

The second plenum 86 is within the second platform 64. The second plenum 86 extends adjacent to each of the first side 68*c*, the trailing end 68*b*, and the second side 68*d* of the airfoil wall 68. In this example, the second plenum 86 includes trip strips 86*a*. Similar to the trip strips 90*a* in the skincore passage 82, the trip strips 86*a* are elongated protrusions or ridges that are obliquely angled to the direction of flow in order to cause turbulence in the flow and enhance cooling. In the skincore passage 82 and the second plenum 86 enhanced cooling may be desired because the bleed air has already absorbed heat in the first platform 62 and is thus at an elevated temperature. The first plenum 78 may exclude any trip strips because the bleed air initially entering the circuit 76 is at a relatively low temperature.

The second platform 64 may also include a plurality of orifices 92. Each orifice 92 has an inlet end 92*a* that opens to the second plenum 86 and an outlet end 92*b* that opens to an exterior of the second platform 64. The bleed air in the second plenum 86 is dumped overboard through the orifices 92. As will be appreciated, the orifices may be located on the trailing edge and/or lateral sides of the second platform.

The circuit 76 may be formed, in part, by investment casting cores and machining operations. For example, cores may be used to form the first plenum 78, the skincore passage 82, and the second plenum 86, while at least portions of the connector passages 80/84 may be formed by machining operations. For instance, there may initially be a wall at the entrance of the first connector passage 80 after casting. A portion of this wall may be machined to provide an opening from the first plenum 78. A remaining portion of the first connector passage 80 may be formed by the same core that is used to form the skincore passage 82. Similarly, there may initially be a wall in the second platform 64 between the skincore passage 82 and the second plenum 86. The wall may be machined to form a portion of or all of the second connector passage 84. To allow access for such machining operations, the platforms 62/64 may be cast with open or partially open faces. After the machining operations, covers 94 may be attached, such as by welding, over the faces. For instance, the cover 94 on the first platform 62 encloses the first connector passage 80 and a portion of the first plenum 78, and the cover 94 on the second platform 64 encloses the second connector passage 84 and a portion of the second plenum 86.

As represented by the wireframe view of the circuit 76, the circuit 76 provides a winding path in the airfoil 60 for flow of the bleed air. The first plenum 78 wraps around a substantial portion of the trailing half of the first platform 62 and turns and extends under the airfoil section 66 to the skincore passage 82. Thus, in the first platform, the circuit 76 makes nearly a 360° loop. In the skincore passage 82 the circuit 76 provides cooling for the first side 68c of the airfoil section 66, which in the example is the suction side. The second connector passage 84 then turns the bleed air toward the perimeter of the second platform 64 and into the second plenum 86. Similar to the first plenum 78, the second plenum 86 wraps around a substantial portion of the trailing half of the second platform 64. The network 76 thus provides a continuous and relatively lengthy path for the bleed air flow to absorb heat from the airfoil and thereby enhance bleed air use for cooling.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity;
    first and second platforms attached, respectively, with the first and second ends;
    a cooling passage circuit extending in the first platform, the airfoil section, and the second platform, the cooling passage circuit including
        a first plenum in the first platform, the first plenum extending adjacent the first side of the airfoil wall, adjacent the trailing end, and adjacent the second side of the airfoil wall,
        a skincore passage embedded in the first side of the airfoil wall and extending longitudinally,
        a first connector passage longitudinally spaced from the internal core cavity so as to extend around the internal core cavity, the first connector passage connecting the first plenum with the skincore passage,
        a second plenum in the second platform, the second plenum extending adjacent the first side of the airfoil wall, adjacent the trailing end, and adjacent the second side of the airfoil wall, and
        a second connector passage connecting the skincore passage with the second plenum.

2. The airfoil as recited in claim 1, wherein the first plenum has an inlet adjacent the first side.

3. The airfoil as recited in claim 1, wherein the first plenum wraps around the internal core cavity.

4. The airfoil as recited in claim 1, wherein the skincore passage includes a plurality of longitudinally-elongated ribs that define longitudinally-elongated passages there between.

5. The airfoil as recited in claim 4, wherein the skincore passage includes a plurality of trip strips in the longitudinally-elongated passages.

6. The airfoil as recited in claim 1, wherein the second connector passage defines a central connector passage axis that forms an oblique angle with the longitudinal direction.

7. The airfoil as recited in claim 1, wherein the second plenum includes a plurality of trip strips.

8. The airfoil as recited in claim 1, wherein the second platform includes a plurality of orifices, each said orifice having an inlet end that opens to the second plenum and an outlet end that opens to an exterior of the second platform.

9. The airfoil as recited in claim 1, wherein the first side is a suction side and the second side is a pressure side.

10. The airfoil as recited in claim 9, wherein the skincore passage includes a plurality of longitudinally-elongated ribs that define longitudinally-elongated passages there between.

11. The airfoil as recited in claim 10, wherein the second platform includes a plurality of orifices, each said orifice having an inlet end that opens to the second plenum and an outlet end that opens to an exterior of the second platform.

12. The airfoil as recited in claim 11, wherein the first plenum wraps around the internal core cavity.

13. The airfoil as recited in claim 12, wherein the second connector passage defines a central connector passage axis that forms an oblique angle with the longitudinal direction.

14. A gas turbine engine comprising:
    a compressor section;
    a combustor in fluid communication with the compressor section; and
    a turbine section in fluid communication with the combustor,
    the turbine section having a turbine airfoil that includes
        an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity,
        first and second platforms attached, respectively, with the first and second ends, and
        a cooling passage circuit extending in the first platform, the airfoil section, and the second platform, the cooling passage circuit including
            a first plenum in the first platform, the first plenum extending adjacent the first side of the airfoil wall, adjacent the trailing end, and adjacent the second side of the airfoil wall,
            a skincore passage embedded in the first side of the airfoil wall and extending longitudinally,
            a first connector passage longitudinally spaced from the internal core cavity so as to extend around the internal core cavity, the first connector passage connecting the first plenum with the skincore passage,
            a second plenum in the second platform, the second plenum extending adjacent the first side of the airfoil wall, adjacent the trailing end, and adjacent the second side of the airfoil wall, and
            a second connector passage connecting the skincore passage with the second plenum.

15. The gas turbine engine as recited in claim 14, wherein the first plenum wraps around the internal core cavity.

16. The gas turbine engine as recited in claim 14, wherein the skincore passage includes a plurality of longitudinally-elongated ribs that define longitudinally-elongated passages there between.

17. The gas turbine engine as recited in claim 14, wherein the second connector passage defines a central connector passage axis that forms an oblique angle with the longitudinal direction.

18. The gas turbine engine as recited in claim 14, wherein the second platform includes a plurality of orifices, each said orifice having an inlet end that opens to the second plenum and an outlet end that opens to an exterior of the second platform.

19. The gas turbine engine as recited in claim 14, wherein the first side is a suction side and the second side is a pressure side.

\* \* \* \* \*